United States Patent [19]
Tomita

[11] Patent Number: 5,549,173
[45] Date of Patent: Aug. 27, 1996

[54] CONTROL DEVICE FOR HYDRAULIC ACTUATOR USED IN STEERING

[75] Inventor: Ryoichi Tomita, Osaka, Japan

[73] Assignee: Sumitomo Precision Products Co., Ltd., Amagasaki, Japan

[21] Appl. No.: 388,893

[22] Filed: Feb. 14, 1995

Related U.S. Application Data

[63] Continuation of Ser. No. 134,900, Oct. 13, 1993, abandoned.

[51] Int. Cl.$^6$ ........................................ B62D 5/06
[52] U.S. Cl. ....................... 180/417; 364/424.05
[58] Field of Search ......................... 180/79.1, 79, 140, 180/142, 132; 364/424.05, 424.01

[56] References Cited

U.S. PATENT DOCUMENTS

| | | | |
|---|---|---|---|
| 4,690,233 | 9/1987 | Daido | 180/142 |
| 4,703,819 | 11/1987 | Hosotani | 180/132 |
| 4,798,253 | 1/1989 | Naito | 180/79.1 |
| 5,020,618 | 7/1991 | Nagao | 180/132 |
| 5,201,380 | 4/1993 | Call | 180/132 |
| 5,263,321 | 11/1993 | Thomsen et al. | 180/142 X |
| 5,347,458 | 9/1994 | Serizawa et al. | 364/424.05 |

*Primary Examiner*—Margaret A. Focarino
*Assistant Examiner*—Victor E. Johnson
*Attorney, Agent, or Firm*—Watson, Cole Grindle & Watson

[57] ABSTRACT

In a control device for a hydraulic actuator used in steering for controlling a hydraulic actuator comprising an angle sensor for detecting an angle of rotation given to a steering wheel, and an angle sensor for detecting an angle of an angular displacement of a vehicle wheel disposed to a steering mechanism for controlling the directional movement of the vehicle wheel with the hydraulic actuator, in which the given angle of an angular displacement of a vehicle wheel to a control device is outputted as an aimed positional signal, an actual angle of an angular displacement of a vehicle wheel of the vehicle wheel is outputted to the control device as a feedback signal, the desired positional signal is compared with the feedback signal to and the aimed positional signal is calculated and outputted to the actuator to control the hydraulic actuator, a memory table for previously storing steering control characteristics is used in a circuit for comparative calculation of an output in accordance with inputs.

4 Claims, 3 Drawing Sheets

Fig. 2

3 BIT ADDRESS ACCORDING TO AIMED POSITIONAL SIGNAL

|   | 1 | 2 | 3 | 4 | 5 | 6 | 7 | 8 |
|---|---|---|---|---|---|---|---|---|
| 1 | L | L | L | L | L | L | L | L |
| 2 | O | O | L | L | L | L | L | L |
| 3 | R | R | O | L | L | L | L | L |
| 4 | R | R | R | O | O | L | L | L |
| 5 | R | R | R | O | O | L | L | L |
| 6 | R | R | R | R | R | O | L | L |
| 7 | R | R | R | R | R | R | O | O |
| 8 | R | R | R | R | R | R | R | R |

3 BIT ADDRESS ACCORDING TO FEEDBACK SIGNAL

L : OPERATION IN NORMAL DIRECTION
O : STOPPING
R : OPERATION IN REVERSE DIRECTION

CONTROL DEVICE FOR HYDRAULIC ACTUATOR USED IN STEERING

This is a continuation of application Ser. No. 08/134,900 filed Oct. 13, 1993, now abandoned.

BACKGROUND OF THE INVENTION

1. Field of the Invention

The present invention concerns a control device for a hydraulic actuator for use in steering, for example, an aircraft, and it relates to a control device for a hydraulic actuator used in steering which is capable of attaining complicated steering characteristics such as non-linear characteristics, with a simple circuit, and easily changing the characteristics with no requirement for the change of the circuit itself.

2. Description of the Prior Art

For reducing the manipulating force required for turning a steering wheel, a so-called steering system using a hydraulic actuator as a power assist has been commonly employed.

The power steering control is provided by a position servo mechanism based on the operation of a steering wheel as an input and an angular displacement of a vehicle wheel as an output. In view of the mechanism, its construction is of the integral type having a hydraulic actuator and a control valve contained in a gear box. A linkage unit houses the actuator, valve, and gear box in a lump in a booster unit which is disposed, for example, at the midway of a steering link mechanism. A spool or rotary type valve is used as the control valve, and an open center valve system that causes no hydraulic pressure unless the steering wheel is operated, is used for either type of valve.

In addition to the construction described above in which the steering wheel and the steering link mechanism are connected mechanically, a steering mechanism is also known for use, for example, in an aircraft, in which a steering wheel is separated from a vehicle wheel. An actuator is operated in accordance with an aimed angle of the wheel indicated, for example, by a potentiometer or the like connected to the steering wheel, thereby rotating the wheel by way of a link mechanism.

In the steering mechanism as described above, a control device of the actuator determines the directional accuracy of a vehicle wheel. A control device in the prior art has such a construction that a desired angle of a vehicle wheel, that is, a desired positional signal indicated by a potentiometer or the like connected to a steering wheel, and a feedback (FB) signal from a potentiometer or the like indicating an actual angle of the vehicle wheel or an actual position of an actuator for operating the vehicle, are inputted and a signal for operating the actuator to turn the vehicle wheel to the desired angle is outputted. An analog circuit having operation amplifiers such as a summing circuit 20 and an output circuit 21 combined as shown in FIG. 3 (A) are used for calculating an output in accordance with the input.

Steering mechanisms wherein the steering wheel is separated from the vehicle wheel and the actuator are different from a mechanical connection and have no steering characteristics on the side of the steering wheel unit. Thus, such characteristics have to be provided to the actuator.

In the control device of the actuator, however, if it is intended to furnish an analog circuit with such steering characteristics as free play characteristics, step characteristics and non-linear characteristics, the circuit will require an idle steering generating circuit 22, a step characteristic generating circuit 23, and a non-linear characteristic generating circuit 24, as shown in FIG. 3B, resulting in a complicated circuit structure.

In addition, if the steering characteristics are to be changed, even a little, the circuit itself has to be changed.

OBJECT OF THE INVENTION

It is, accordingly, an object of the present invention to provide a control device for a hydraulic actuator used in steering, capable of attaining complicated steering characteristics with a reduced number of parts and a simple circuit, as well as changing characteristics easily with no requirement for modification of the circuit itself.

SUMMARY OF THE INVENTION

The foregoing object of the present invention can be attained by a control device for a hydraulic actuator used in steering, comprising an angle sensor for detecting an angle of rotation given to a steering wheel and an angle sensor for detecting an angular displacement of a vehicle wheel connected to a steering mechanism for controlling the directional movement of a vehicle wheel with the hydraulic actuator, in which the given angle of an angular displacement is outputted to a control device as a desired positional signal, an actual angle of an angular displacement of the vehicle wheel is outputted to the control device as a feedback signal, the desired positional signal is compared with the feedback signal, and a modified positional signal is calculated and outputted to the actuator to control the hydraulic actuator. The invention is further characterized in that a memory table for previously storing steering control characteristics is used in a memory IC for comparative calculation of an output in accordance with an input.

In accordance with the control device of the present invention, if a potentiometer is used, for instance, as an angle sensor, input analog signals are converted by an A/D converter into digital signals. Digital signals for the desired positional signal and the feedback signal are inputted as address signals, respectively, to a memory IC and then outputted in accordance with a data in the memory storing a predetermined characteristic table.

For instance, assuming that numerical values corresponding to a desired position and an actual position are 12H and 34H by hexadecimal expression respectively, when a steering wheel is turned to an angle, if a value for operating an actuator is stored at an address 1234H, a vehicle wheel moves toward the desired position.

When a numerical value corresponding to the actual position becomes 33H by the rotation, the address changes to 1233H. If a value for operating the actuator is also stored at that address, the wheel further moves toward the desired position.

In this way, the actuator can be operated until the numerical value corresponding to the actual position becomes 12H.

Further, if data for stopping the actuator is stored at the address 1212H, while data for operating the actuator in the reverse direction are stored at an address smaller than 12H, the vehicle wheel can be controlled so as to move toward the desired position.

In the present invention, so long as the steering control characteristics can be stored previously as described above, any kind of semiconductor means can be utilized as the memory table and FIG. 2 shows an example of a data table having a 6 bit address size in which 3 bits are allocated to each of the inputs. In FIG. 2, L denotes operation in the normal direction, O denotes stopping and R denotes operation in the reverse direction.

In the present invention, a potentiometer of a known construction such as shown in the embodiment can be utilized for the angle sensor and, if an output signal is an analog signal, it can be converted by A/D converter in the control device into a digital signal for use.

In the present invention, the hydraulic actuator is properly selected from known type such as a cylinder type in accordance with application use, vehicle wheel, and steering mechanism, and a control output signal of the control device is also determined depending on the control mechanism of the actuator.

BRIEF DESCRIPTION OF THE DRAWINGS

FIG. 2 is an explanatory view showing an example of a data table having 6 bit address size, with 3 bits being allocated to each of the inputs.

DESCRIPTION OF THE PREFERRED EMBODIMENT

Figure 1:
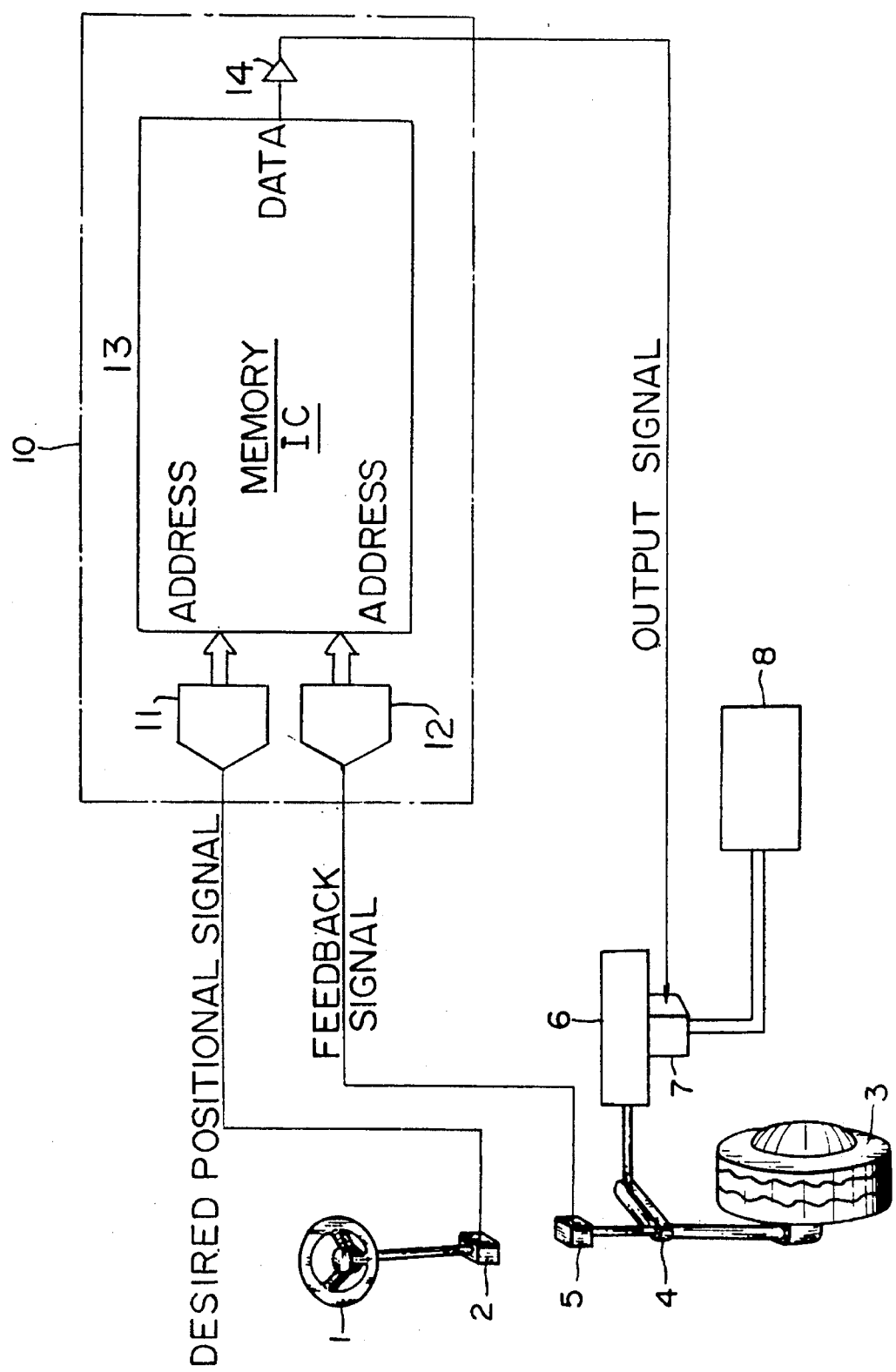
FIG. 1 is a block diagram for explaining a preferred embodiment of a control device for a hydraulic actuator used in steering according to the present invention.
Figure 3A:
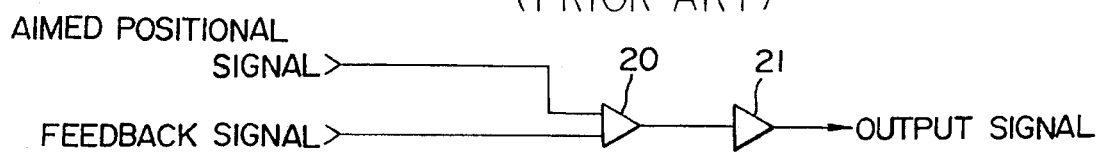
FIG. 3 is an explanatory block diagram showing an example of a control device in the prior art.
Figure 3B:
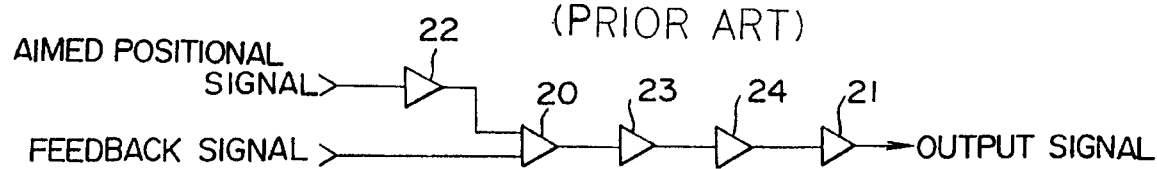

FIG. 1 is a block diagram which explains a preferred embodiment of a control device for a hydraulic actuator used in steering according to the present invention. A control device for controlling a hydraulic actuator comprises an angle sensor disposed for detecting an angle of rotation given to a steering wheel and an angle sensor for detecting the angle of an angular displacement of a vehicle wheel disposed to a steering mechanism for controlling the directional move of the vehicle wheel by a hydraulic actuator, in which the given angle of an angular displacement as a desired positional signal is outputted to the control device, an actual angle of an angular displacement of a vehicle wheel is outputted as a feedback signal to the control device, the desired positional signal is compared with the feedback signal, a modified positional signal is calculated and outputted to the actuator thereby controlling the actuator.

A potentiometer 2 is disposed adjacent a steering wheel 1, to enable the angle of rotation of the steering wheel 1 turned by a driver. The potentiometer 2 outputs the angle of rotation given by the driver as the desired positional signal to a control device 10.

A steering mechanism 4 is disposed adjacent a vehicle wheel 3 and made movable by a cylinder type hydraulic actuator 6 in this embodiment and, further, a potentiometer 5 is disposed along a rotational shaft of the vehicle wheel 3, which detects the position of the hydraulic actuator 6, that is, the actual angle of an angular displacement of the vehicle wheel 3, and outputs the same as a feedback signal (SB) to a control device 10.

Further, a solenoid valve 7 is disposed adjacent the hydraulic actuator 6, which controls a pressurized oil from an oil pressure source 8 to expand and retract the cylinder.

The control device 10 comprises A/D converter circuits 11, 12 for conversion of analog signals from the potentiometers 2, 5 into digital signals, a memory IC 13 for storing control data, and an output amplifier 14 for driving the solenoid valve 7 of the hydraulic actuator 6.

Numerical values shown by the A/D converter circuits 11, 12 constitute an address in the memory IC 13, and a signal for expanding, contracting or stopping the hydraulic actuator 6 is outputted from an output amplifier 14 to the solenoid valve 7 based on the data at that address of the memory IC 13.

The control device 10 can control the hydraulic actuator 6 by way of the solenoid valve 7 in accordance with the input signal from the potentiometer 2 of the steering wheel 1 and in accordance with the steering control characteristics previously stored in the memory IC 13.

Further, the control characteristics shown by the memory IC 13 can be set optionally relative to the numerical value shown by the A/D converter circuits 11, 12. For instance, the control characteristics of the steering wheel can be made nonlinear easily by storing the table as shown in FIG. 4 into the memory IC 13.

Figure 4:
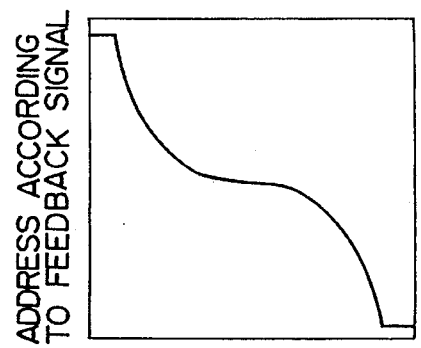
FIG. 4 is an explanatory view illustrating an example of non-linear steering control characteristics.

In FIG. 4, a curved region represents stopping, an upper area of the curved region represents an operation in the normal direction, and a lower area of the curved region represents an operation in the reverse direction.

The control device for the hydraulic actuator used in a steering wheel according to the present invention can provide complicated steering control characteristics, such as a non-linear form, with a simple circuit as can be seen in the embodiment above. The device can also easily change the steering control characteristics by merely rewriting the memory, without requiring modification of the IC itself, a feature preferred in a control device for a hydraulic actuator used in steering, for example, an aircraft.

What is claimed is:

1. A steering control assembly for a vehicle that includes a steering wheel, a vehicle wheel which is angularly displaceable to steer the vehicle, and a hydraulic actuator connected to the vehicle wheel to angularly displace said vehicle wheel, said hydraulic actuator including a solenoid valve which is controllable by a control signal, said control assembly comprising a control device, a first angle sensor connected to the steering wheel for detecting an angle of rotation of said steering wheel and providing an analog desired positional signal in response to the detected angle of rotation, means for transmitting said analog desired positional signal to said control device, a second angle sensor connected to the vehicle wheel for detecting an actual angle of angular displacement of said vehicle wheel and providing an analog feedback signal in response to the detected actual angle of angular displacement, and means for transmitting said analog feedback signal to said control device, wherein said control device consists of: first and second analog/digital converters for respectively converting said analog desired positional signal and said analog feedback signal to first and second digital signals; a memory IC which contains steering control characteristics stored at a plurality of addresses, wherein each address is defined by a pair of digital signals corresponding to a predetermined desired positional signal and a predetermined feedback signal, and when said first and second digital signals define an address stored in said memory IC said memory IC provides an output signal corresponding to steering control characteristics stored at the address to operate said solenoid valve, said memory IC being connected directly to said analog/digital converters for determining the address corresponding to said first and second digital signals; an output amplifier directly connected to data lines of the memory IC for converting said output signal into said control signal; and means for transmitting said control signal to said hydraulic actuator for control thereof.

2. A steering control assembly as defined in claim 1, wherein said hydraulic actuator further includes a cylinder and an oil pressure source in communication with said cylinder, and said solenoid valve controls pressurized oil flow to and from the oil pressure source to expand and retract the cylinder.

3. A steering control assembly as defined in claim 1, wherein said first angle sensor comprises a potentiometer.

4. The steering control assembly of claim 1, wherein said memory IC includes a semiconductor memory table which contains said steering control characteristics stored at said plurality of addresses.

* * * * *